March 30, 1954  A. T. SCHEIWER  2,673,750
COUPLING
Filed June 18, 1949
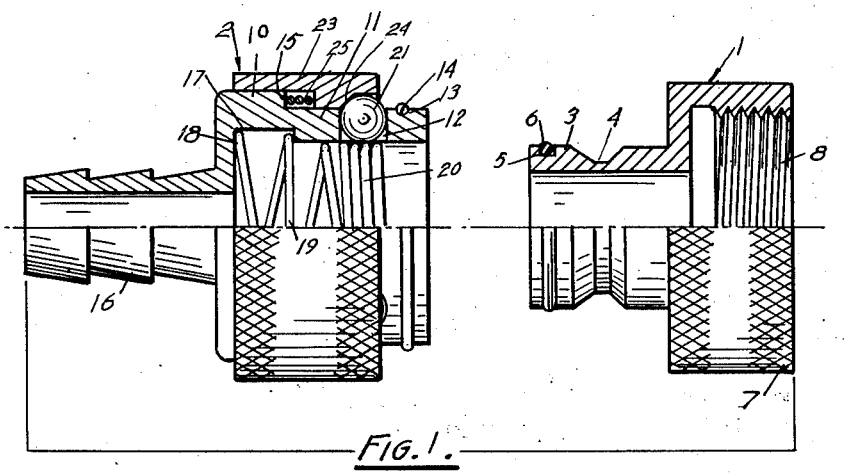
FIG. 1.
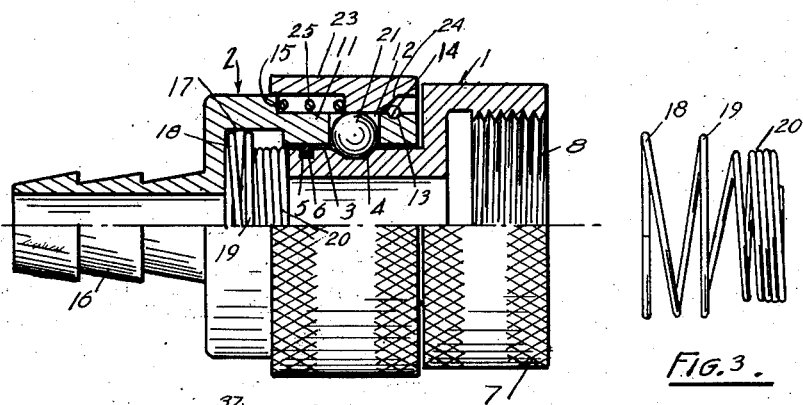
FIG. 2.
FIG. 3.
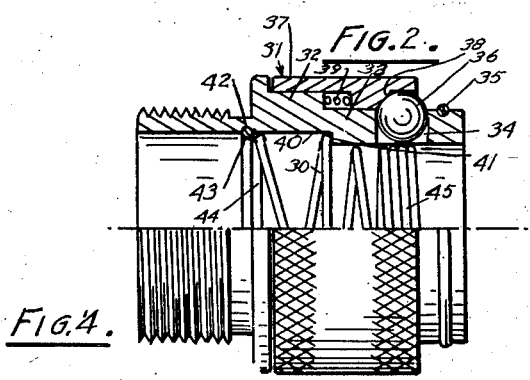
FIG. 4.
INVENTOR
Albert T. Scheiwer
BY
Florian L. Miller
ATTORNEY Patented Mar. 30, 1954

2,673,750

UNITED STATES PATENT OFFICE 2,673,750

COUPLING

Albert T. Scheiwer, Erie, Pa.

Application June 18, 1949, Serial No. 100,062

4 Claims. (Cl. 285—169)

This invention relates generally to couplings and more particularly to quickly attachable snap action couplings for hose and the like.

In couplings known as ball type snap action couplings, it has been necessary to draw the locking sleeve on the female coupling member out of engagement with the balls and hold them out of engagement therewith while the connecting portion of the male member was inserted into the female member. Sliding inner sleeves and other means to accomplish this result greatly restrict the flow of fluid through the coupling, and they are complicated and costly. No simple means has heretofore been provided which permits the connection of the male and female members of a hose coupling by merely inserting the connecting portion of the male member into the female member.

It is, accordingly, an object of my invention to overcome the above and other defects in present hose couplings and it is more particularly an object of my invention to provide a hose coupling which is simple in construction, economical in cost, economical in manufacture, and efficient in operation.

Another object of my invention is to provide novel means for holding the balls or detent members in a female coupling member outwardly in the path of the locking sleeve thereon whereby the connecting portion of the male member of the coupling may be inserted into the female member without any manual movement of the locking sleeve.

Another object of my invention is to provide a cylindrical spring member which may be snapped into or from a female coupling member for holding the detent members in a female coupling member outwardly when in a disconnected position, which is moved longitudinally by the connecting portion of the male coupling member when it is inserted into the female coupling member to permit connection of the male and female coupling members, and which urges the male coupling member from the female coupling member upon disconnection thereof.

Other objects of my invention will become evident from the following detailed description, taken in conjunction with the accompanying drawings, in which:

Fig. 1 is an exploded view of my novel coupling members broken away on the center line thereof for better illustration showing the female coupling member in a disconnected position with the balls held outwardly in the path of the locking sleeve and in a position to receive the connecting portion of the male coupling member;

Fig. 2 is a side elevational view broken away on the center line thereof with my novel coupling in a locked position;

Fig. 3 is a side elevational view of the novel spring member for holding the balls of the female member outwardly in the path of the locking sleeve thereon; and Fig. 4 is a side elevational view broken away on the center line thereof of a modified form of my novel coupling member.

Referring now to the drawings, I show in Figs. 1, 2, and 3 a male coupling member 1 and a female coupling member 2. The male coupling member 1 has a connecting portion 3 with a peripheral groove 4, a washer groove 5 with a ring washer 6, and an enlarged knurled portion 7. The portion 7 has internal threads 8 for connection to any suitable hose connection.

The female coupling member 2 comprises a cylindrical shell 10 having a stepped portion 11 with radially extending ball retaining apertures 12, a peripheral groove 13 for retaining a stop clip 14, a shoulder 15, an outwardly extending hose connecting portion 16, and an internal grooved portion 17 for nesting the enlarged, open, helically wound spring portion 18 of the member 19. The portion 20 of the member 19 is closely wound and engages detents or balls 21 in the ball retaining apertures 12. A locking sleeve 23 has a camming portion 24 for engaging the detents or balls 21 and locking them into engagement with the peripheral groove 4 on the connecting portion 3 of the male member 1. A coil spring 25 urges the camming portion 24 of the locking sleeve 23 against the balls 21 and against the stop clip 14.

In operation, when my novel coupling is in an unlocked position as shown in Fig. 1, it is merely necessary that the connecting portion 3 of the male member 1 be inserted into the female member 2 into engagement with the closely wound portion 20 of the member 19. As the connecting portion 3 of the male member 1 is moved longitudinally, the spring portion 18 of the member 19 will be compressed to a position as shown in Fig. 2 and the closely wound portion 20 will move out of engagement with the balls 21 so that they are urged into locking engagement with the peripheral groove 4 on the connecting portion 3 of the male member 1 as shown in Fig. 2 by the camming portion 24 of the spring urged locking sleeve 23. Upon disconnection, the locking sleeve 23 is moved out of engagement with the balls 21 and the connecting portion 3 of the male member 1 is forced from the female member 2 by the spring 19. The closely wound portion 20 of the member 19 engages the balls 21 and holds them outwardly in the path of the locking sleeve 23 as shown in Fig. 1 so that a connection can again be made by merely inserting the connecting portion 3 of the male member 1 into the female member 2.

In Fig. 4, I show a slightly modified female coupling member wherein the member 30 is identically the same as the member 19 in Figs. 1 and 2 but it is inserted from the back end of the female member 31. The female member 31 comprises stepped portions 32 and 33, radially extending ball retaining apertures 34, a stop clip 35, detents or balls 36 in the apertures 34, a locking sleeve 37 with a camming portion 38 for engaging the balls 36, and a spring 39 for urging the camming portion 38 of the locking sleeve 37 into engagement with the balls 36. The inner portion of the female member 31 is stepped at 40 forming a shoulder 41, the stepped portion having a peripheral groove 42 and a stop clip 43 for retaining enlarged spring portion 44 of the member 30 between the shoulder 41 and clip 43. The helically, open wound portion 44 is larger than closely wound portion 45 of the member 30. The operation of the female member 31 shown in Fig. 4 is the same as has been described for the female member 2 shown in Figs. 1 and 2.

It will be evident from the foregoing description that I have provided novel means for holding the balls or detent members in a female coupling member outwardly in the path of the locking sleeve while it is disconnected so that it is only necessary to insert the connecting portion of the male member into the female member to make a snap connection, which permits a maximum flow of fluid through the coupling, which may be removed and replaced without disassembly of the coupling, and which requires a minimum of costly machining operations.

Various changes may be made in the specific embodiment of my invention without departing from the spirit thereof or from the scope of the appended claims.

What I claim is:

1. A coupling comprising a male coupling member having a connecting portion with a peripheral groove; and a female coupling member having an internally grooved cylindrical shell, a detent member carried by said shell, a spring urged camming sleeve telescopically and slidably disposed on said shell and having camming surfaces on the inner surface thereof for urging said detent member into said male member groove, lockingly engaging said detent member in the peripheral groove on said male coupling member to lock said male and female coupling members together, and a helically wound spring wire member having an enlarged helix portion nesting in the groove in said shell, said helically wound member having a reduced helix portion engaging said detent member holding said detent member outwardly into the path of movement of said spring urged camming sleeve when said female coupling member is disconnected from said male coupling member, said male coupling member engaging said reduced helix portion moving said reduced helix portion out of the path of said detent member in said female coupling member.

2. A coupling comprising a male coupling member having a connecting portion; and a female coupling member having a cylindrical shell, a detent member carried by said shell, releasable means for lockingly engaging said detent member with the connecting portion of said male member for connecting said male and female coupling members together, a cylindrical helically wound spring member disposed in said shell of said female member, and means to limit the movement of a plurality of the turns of the helical member remote from the detent means, the other end of said helically wound member engageable with said detent member when said female coupling member is disconnected from said male member holding said detent member out of the path of said connecting portion of said male coupling member upon insertion thereof in said female member, said spring member being movable longitudinally upon insertion and engagement with the connecting portion of said male coupling member to release said detent member whereby said detent member lockingly engages the connecting portion of said male coupling member.

3. A coupling as set forth in claim 1 wherein said male member has a groove in the connecting portion and a ring washer disposed in said groove whereby a seal is formed between said female member and said male member upon insertion of said male member into said female member.

4. A coupling comprising a male coupling member having a connecting portion with a peripheral groove; and a female coupling member having an internally grooved cylindrical shell with an internal shoulder spaced from the groove in said shell, detent members carried by said shell, a spring urged camming sleeve for urging said detent members into engagement with the peripheral groove on the connecting portion of said male member to lock said male and female coupling members together, a stop clip disposed in the groove in said shell of said female member, and a helically wound wire member having one end thereof enlarged and nested between said shoulder and said stop clip in said shell of said female member and the other end thereof closely wound and engaging said detent members to hold them outwardly from the path of said camming sleeve in a retracted position when said female coupling member is disconnected from said male coupling member whereby the detent members in said female coupling member automatically move into engagement with the peripheral groove on the connecting portion of said male member upon the insertion of the connecting portion of said male member into said female member moving said wire member longitudinally.

ALBERT T. SCHEIWER.

References Cited in the file of this patent

UNITED STATES PATENTS

| Number | Name | Date |
|--------|------|------|
| 1,468,732 | Bradbury | Sept. 25, 1923 |
| 1,848,533 | Mudd | Mar. 8, 1932 |
| 2,279,146 | Schneller | Apr. 7, 1942 |
| 2,344,740 | Shaff | Mar. 21, 1944 |
| 2,377,812 | Scheiwer | June 5, 1945 |
| 2,400,817 | Fox et al. | May 21, 1946 |
| 2,428,638 | Scheiwer | Oct. 7, 1947 |
| 2,461,700 | Scheiwer | Feb. 15, 1949 |
| 2,473,973 | Scheiwer | June 21, 1949 |
| 2,568,516 | Scheiwer | Sept. 18, 1951 |